(12) United States Patent
Roy et al.

(10) Patent No.: US 11,743,412 B2
(45) Date of Patent: Aug. 29, 2023

(54) REDUCED MEMORY SCANNER CALIBRATION SYSTEM AND METHOD

(71) Applicant: Xerox Corporation, Norwalk, CT (US)

(72) Inventors: Jason Roy, Ontario, NY (US); John Guarrera, Rochester, NY (US); William David Notovitz, Webster, NY (US); Michael John Wilsher, Letchworth Garden City (GB)

(73) Assignee: XEROX CORPORATION, Norwalk, CT (US)

( * ) Notice: Subject to any disclaimer, the term of this patent is extended or adjusted under 35 U.S.C. 154(b) by 164 days.

(21) Appl. No.: 17/186,825

(22) Filed: Feb. 26, 2021

(65) Prior Publication Data
US 2022/0279089 A1 Sep. 1, 2022

(51) Int. Cl.
*H04N 1/41* (2006.01)
*H04N 1/21* (2006.01)
*H04N 1/00* (2006.01)
*H04N 1/04* (2006.01)

(52) U.S. Cl.
CPC ........... *H04N 1/41* (2013.01); *H04N 1/00087* (2013.01); *H04N 1/04* (2013.01); *H04N 1/21* (2013.01)

(58) Field of Classification Search
None
See application file for complete search history.

(56) References Cited

U.S. PATENT DOCUMENTS

| 5,204,761 A | 4/1993 | Gusmano | |
|---|---|---|---|
| 5,298,937 A | 3/1994 | Telle | |
| 5,563,723 A | 10/1996 | Beaulieu et al. | |
| 6,069,715 A | 5/2000 | Wang | |
| 10,212,304 B2 | 2/2019 | Wilsher et al. | |
| 2003/0112480 A1* | 6/2003 | Chiu | H04N 1/4076 358/504 |
| 2005/0185227 A1* | 8/2005 | Thompson | H04N 1/0009 358/406 |
| 2006/0001921 A1* | 1/2006 | Bailey | H04N 25/63 348/E5.081 |
| 2006/0013476 A1* | 1/2006 | Schweid | H04N 1/64 382/162 |

* cited by examiner

*Primary Examiner* — Andrew H Lam
(74) *Attorney, Agent, or Firm* — Lippes Mathias LLP

(57) ABSTRACT

A scanner calibration system is provided. The scanner calibration system includes memory configured in a format to store therein encoded gain and offset parameters. Such a configuration reduces the amount of required memory for the scanner calibration system without a compromise of performance.

13 Claims, 6 Drawing Sheets

REDUCED MEMORY SCANNER CALIBRATION SYSTEM AND METHOD

BACKGROUND

Both light variations and sensor sensitivity contribute to the need to calibrate scanner data. One possible drawback to scanner calibration systems and techniques is that, in some circumstances, they have characteristics that are dictated by or depend on their specific system requirements and/or hardware implementations.

For example, memory capacity is a valued feature of scanner calibration systems. In this regard, for example, available memory capacity is typically a scarce resource in the systems and implementations using Field Programmable Gate Arrays (FPGAs). In these and other systems, memory can be an expensive resource.

BRIEF DESCRIPTION

According to the presently described embodiments, improvements in existing scanner calibration systems and/or hardware implementations are provided to enhance their performance and/or efficiency. In this regard, reducing memory consumption and/or increasing memory efficiency by utilizing various encoding/decoding techniques results in benefits for such a scanner calibration system.

In accordance with one aspect of the presently described embodiments, a scanner calibration system comprises a scan device configured to scan a document or image to generate analog scan data, a front-end processor configured to convert the analog scan data to 10-bit digital scan data, a field programmable gate array configured to receive the 10-bit scan data, retrieve encoded 9-bit gain and offset data, decode the 9-bit gain and offset data into 10-bit gain and offset data, apply the decoded 10-bit gain and offset data to the 10-bit scan data to generate calibrated image data, and store the calibrated image data, and a memory configured to have stored therein the calibrated image data.

In accordance with another aspect of the presently described embodiments, the system comprises an output device configured to output the calibrated image data.

In accordance with another aspect of the presently described embodiments, during a calibration process, the field programmable gate array is configured to decode the encoded 9-bit gain value by adding a predetermined value to the encoded 9-bit gain value to produce the decoded 10-bit gain value.

In accordance with another aspect of the presently described embodiments, the predetermined value is 0x1.00.

In accordance with another aspect of the presently described embodiments, during a calibration process, the field programmable gate array is configured to decode the encoded 9-bit offset value by adding a most significant bit to the encoded 9-bit offset value to produce the decoded 10-bit offset value.

In accordance with another aspect of the presently described embodiments, wherein the field programmable gate array is configured to encode 10-bit gain values by subtracting a predetermined value from the 10-bit gain values to produce 9-bit encoded gain values.

In accordance with another aspect of the presently described embodiments, the predetermined value is 0x1.00.

In accordance with another aspect of the presently described embodiments, the field programmable gate array is configured to encode 10-bit offset values by deleting a most significant bit of the 10-bit offset values to produce 9-bit encoded offset values.

In accordance with another aspect of the presently described embodiments, a calibration method for use in a scanning system comprises generating analog sensor data by scanning a document or image using a scan head or device, converting the analog sensor data to 10-bit digital scan data, retrieving encoded 9-bit gain and offset values, decoding the encoded 9-bit gain value to a 10-bit gain value, decoding the encoded 9-bit offset value to a 10-bit offset value, applying the decoded 10-bit gain and offset values to the 10-bit digital scan data to generate calibrated image data, and storing the calibrated image data.

In accordance with another aspect of the presently described embodiments, the method comprises outputting the calibrated image data.

In accordance with another aspect of the presently described embodiments, the decoding of the encoded 9-bit gain value comprises adding a predetermined value to the 9-bit gain value to produce the 10-bit gain value.

In accordance with another aspect of the presently described embodiments, the predetermined value is 0x1.00.

In accordance with another aspect of the presently described embodiments, the decoding of the encoded 9-bit offset value comprises adding a most significant bit to the 9-bit offset value to produce the 10-bit offset value.

In accordance with another aspect of the presently described embodiments, an encoding method for use in a scanner and calibration system comprises generating or retrieving 10-bit gain and offset values, encoding the 10-bit gain value to a 9-bit encoded gain value, encoding the 10-bit offset value to a 9-bit encoded offset value, and storing the encoded 9-bit offset and gain values.

In accordance with another aspect of the presently described embodiments, the encoding of the 10-bit gain value comprises subtracting a predetermined value from the 10-bit gain value to produce the 9-bit encoded gain value.

In accordance with another aspect of the presently described embodiments, the predetermined value is 0x1.00.

In accordance with another aspect of the presently described embodiments, the encoding of the 10-bit offset value comprises deleting a most significant bit of the 10-bit offset value to produce the 9-bit encoded offset value.

In accordance with another aspect of the presently described embodiments, a calibration method for use in a scanning system comprises generating analog sensor data by scanning a document or image using a scan head or device, converting the analog sensor data to n-bit digital scan data, retrieving encoded <n-bit gain and offset values, decoding the encoded <n-bit gain value to an n-bit gain value, decoding the encoded <n-bit offset value to an n-bit offset value, applying the decoded n-bit gain and offset values to the n-bit digital scan data to generate calibrated image data and storing the calibrated image data.

In accordance with another aspect of the presently described embodiments, the method further comprises outputting the calibrated image data.

In accordance with another aspect of the presently described embodiments, an encoding method for use in a scanner and calibration system comprises generating or retrieving n-bit gain and offset values, encoding the n-bit gain value to a <n-bit encoded gain value, encoding the n-bit offset value to a <n-bit encoded offset value and storing the encoded <n-bit offset and gain values.

DETAILED DESCRIPTION

According to the presently described embodiments, in scanner calibration systems (particularly such systems using Field Programmable Gate Arrays (FPGAs)), knowledge of the practical limitations and/or ranges of typical gain and offset values used in the calibration function are leveraged to reduce the memory requirements needed to perform the calibration function. From a practical standpoint, reducing memory requirements typically results in less cost and/or better efficiency. Also, this is accomplished according to the presently described embodiments without a reduction or degradation in performance in the scanning and calibration system and/or method.

In this regard, scanner data typically has a bit depth of 8, 10, 12, or 16 bits, while printing systems typically have a bit depth of 1 to 8 bits. Ultimately, the native scanner bit depth is decimated during calibration to achieve a uniform output pixel representation.

The calibration function in hardware implements the algorithm for each pixel:

$$\text{video\_cal}[n] = ((\text{video\_in}[n] - \text{offset}[n]) * \text{global\_gain}) * \text{pixel\_gain}[n] \quad (1)$$

The offset, global_gain and pixel_gain are 10-bit values. The offset and pixel_gain values are unique to each pixel. The global_gain value is not unique to each pixel.

Consider a 600 dot per inch scanning system, with a sensor span of 12 inches. In such a system, 7200 pixels need to be calibrated per scan array. For this system, an 8K by 10-bit memory is required to store each of the pixel_gain and offset values. For a color scanner, each color plane is calibrated independently with unique pixel_gain and offset values. As such, a duplex scanner with two arrays will require memory to support (3 colors*7200 pixels per color*10-bits/pixel*2 gain/offset)*2 arrays for a total of 864,000 bits.

Field Programmable Gate Array (FPGA) based memory systems are block based. For example, referring to FIG. 1, an FPGA-based memory system, such as the memory system identified as memory system 100, has 36K-bit blocks, which is common among such memory systems. These memory systems could also have 18K-bit ½ blocks. FPGA tools configure these memories to optimize the memory usage. A built-in memory that is 36K bits may be configured as 2K×18-bits, 4K×9-bits or 8K×4-bits.

These blocks have a fixed/limited configurable aspect ratio that can be synthesized. The native width of building memories within FPGAs are typically 9, 18 or 36-bits. This is intended to support parity and error detection for each 8-bit data written. Thus, due to the prevalent use of parity and error correction coding schemes, 9-bit widths are a native aspect ratio (8 bits+1) for these memory systems.

Figure 1:
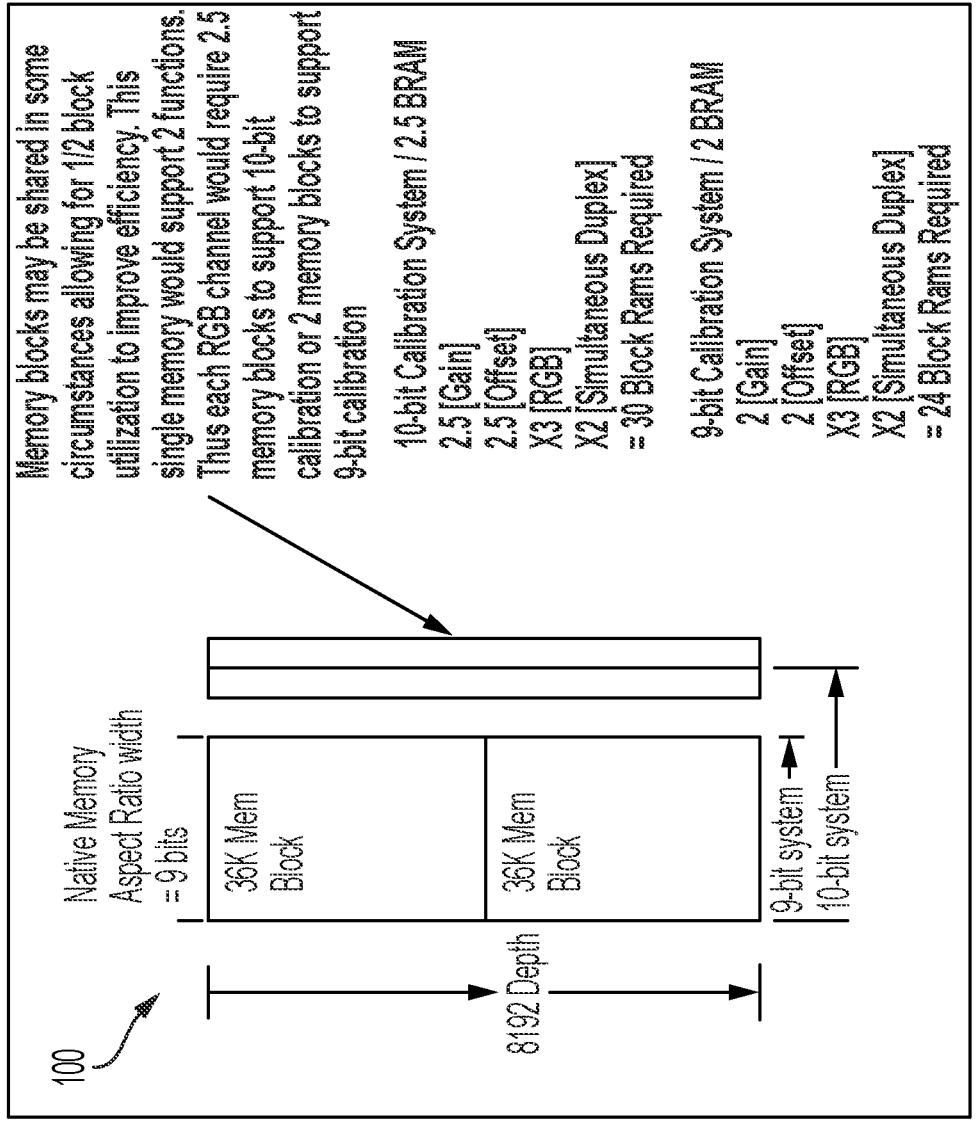
FIG. 1 is a representative view of the reduced memory scanner calibration system according to the presently described embodiments.

Because of this block nature of FPGA based memory, for the noted example case of 36K bit memory block size, the example calibration function would consume 24 blocks—if 100% memory mapping efficient could be achieved. However, as illustrated in FIG. 1, for a 10-bit×8192 depth calibration system, the memory blocks required will be 2.5 blocks per each of the gain and offset. Due to the aspect ratio limitations imposed by block memories, 30 memory blocks are required resulting in a 75% memory utilization efficiency.

With further reference to FIG. 1, reducing the offset[n] and pixel_gain memory widths to 9-bits matches the built-in memory widths aspect ratio of FPGA memories, and reduces the total memory required by 10%. Where the original 10-bit depth system required 30 memory blocks, a constrained 9-bit memory system requires only 24 memory blocks. This reduces the overall memory requirement by 20%, thus freeing up 6 memory blocks or 216,000 bits of memory. For many applications, this is a significant amount of memory.

As noted above, according to the presently described embodiments, such reduced memory consumption or increased memory efficiency is achieved without a reduction or degradation in performance. As will be detailed below, knowledge of offset and gain values is leveraged to reduce memory requirements needed to perform calibration functions without loss of, for example, image resolution.

First, if the offset[n] values in equation (1) above, also referred to herein simply as offset values, are constrained to less than 512 levels, the offset memories could be reduced to the irregular 9-bit depth values without affecting the calibration results. This can be accomplished because the typical offset has a value between 80 and 200. Accordingly, a 9-bit space would allow for values between 0 and 512—which is adequate to accommodate an offset between 80 and 200.

To implement this 9-bit feature for the offset value, the most significant bit of the typical 10-bit offset value is deleted during an encoding and storing process. In this way, during the calibration process, when the 9-bit value is retrieved from the appropriate memory location and decoded into to a 10-bit value for use in the calibration process, the most significant bit need only be appended to the data value. In addition, because values between 0 and 512 are sufficient to represent the offset value for purposes of the contemplated calibration techniques, there is no reduction in overall quality, performance, or resolution.

Second, the pixel_gain[n] values in equation (1) above, also referred to herein simply as the gain values, are treated as 10-bit floating point values with 2 integer bits and 8 fractional bits. As such, the 10-bit gain value range is between 0x0.00 and 0x3.FF. For a system where unity gain is the minimum and the maximum gain is 3, the gain values used are only between 0x1.00 and 0x2.FF where 0x2.ff is a 10-bit value. Therefore, parts of the range (i.e. 0x0.00 to 0x1.00 and 0x2.FF to 0x3.FF) are not needed to represent the gain values used in the contemplated calibration techniques and can be eliminated. This reduces the gain values to 9-bit values.

More specifically, during an encoding and storing process, a predetermined value, i.e., 0x1.00, is subtracted from the values written into the pixel gain memories. As a result, the stored values are between 0x0.00 and 0x1.ff, which are 9-bit values. On retrieval and decoding of the 9-bit values from the memories during the calibration process, 0x1.00 is added back to the stored value to produce the original 10-bit intended value, which can then be effectively used in the calibration process.

Again, as noted above, with this implementation, there is no reduction or degradation in performance in the scanning and calibration system and/or method. Because the systems contemplated herein typically make use of a global gain value, the gain values will not drop below certain expected values, thus making the subtraction described above possible without a reduction in overall quality, performance, or resolution.

To reiterate, with respect to both offset and gain instances, the values are calculated as 10-bit values. In accordance with the presently described embodiments, because only part of the 10-bit range is used, they can be encoded into 9 bits and then decoded back to 10 bits for use. Thus, in at least one form, the quality and accuracy of the calibration is unaffected when implementing the presently described embodiments. In the process of calculation, if a value ever falls outside the expected range, this event can be flagged.

Variations of the examples described thus far may also be implemented for gain and/or offset values, depending on the specific implementation. In this regard, for example, different values could be added or subtracted in the process to decode or encode in connection with a desired range. For example, for the range of 0x0.80-0x2.80, the value 0x0.80 could be added or subtracted. Further, the mathematical techniques described could be used in a piecewise manner—add or subtract the most significant bit (MSB) for part of the range and add or subtract a predetermined value to another part of the range. Still further, there may be desired ranges where the 10-bit range is not continuous (e.g., 0 to 255 and 512 to 767). In these situations, different predetermined values may be used to effectively separate parts of the range (e.g., delete the MSB for values under 255, and subtract 0x0.80 (or 256) from the rest).

In variations where precision is not paramount or where slight degradation is acceptable, different mathematical techniques, such as multiplication or division (including deleting the least significant bit (LSB)) or application of conversion functions, could be implemented to have the effect of moving between 9-bit space and 10-bit space. These less exacting techniques will result in a quantization and, therefore, will not result in perfect decoding. However, where at least some imperfect decoding is acceptable, an example resides where the desired offset value is almost always between 80-200 and only occasionally between 200-767. In this case, it is possible that perfect precision is not necessary for the higher values. One approach is to delete the MSB for values under 255, add 256 to the rest, and then divide by 2 (e.g., by deleting the LSB). This results in a range of 256-511— with the lower values perfectly stored and the upper values quantized. Of course, other variations for gain and/or offset values, depending on the specific implementation, may be implemented as well.

Figure 2:
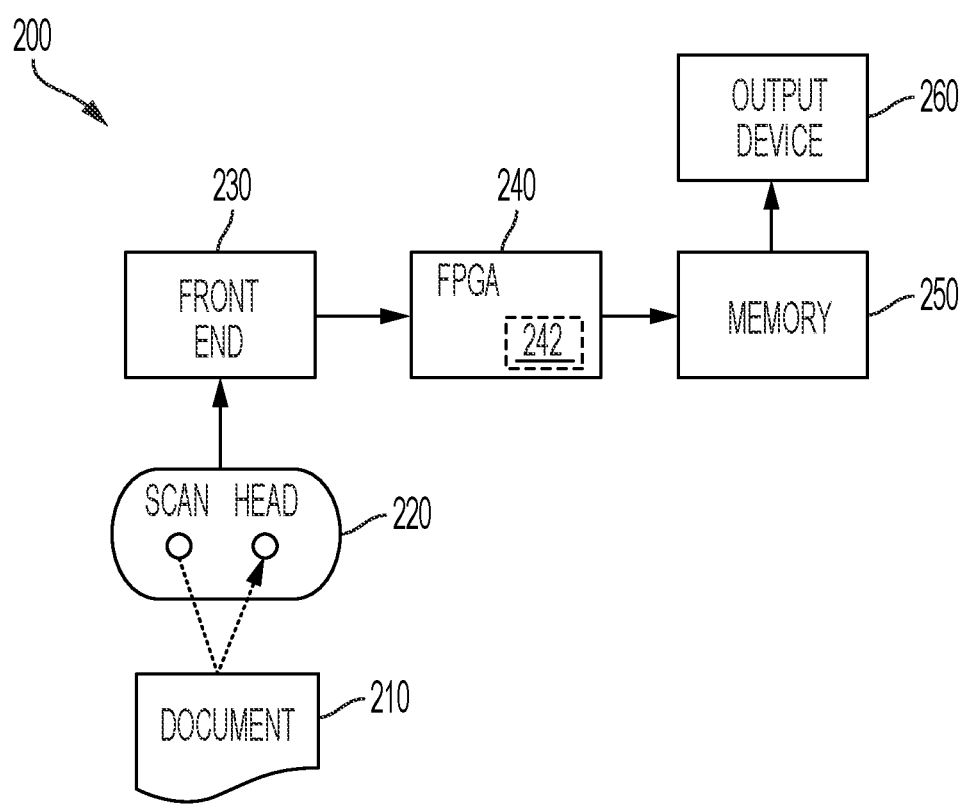
FIG. 2 is a representative view of a scanning system according to the presently described embodiments.

With reference to FIG. 2, a scanning system 200 according to the presently described embodiments is shown. In operation, the scanning system 200 is configured to scan a document 210 using a scan head or device 220. The scan process is controlled by a front-end processor 230 that is configured to receive analog data from the scan head 220 and convert such analog data to digital 10-bit, uncalibrated scan data. The front-end processor 230 then sends the digital 10-bit data to a Field Programmable Gate Array (FPGA) 240. The FPGA 240 is configured to apply appropriate gain and offset values to the digital 10-bit scanner data according to the presently described embodiments. The FPGA 240 is also configured to, at appropriate times, encode, decode, retrieve, and store the gain and offset values according to the presently described embodiments. The FPGA 240 includes a memory section 242 that is configured to store the gain and offset values according to the presently described embodiments. As discussed in connection with FIG. 1 and, for example, memory section 100, the memory section 242 is comprised of blocks of memory having a native aspect ratio of, in at least one example, 9-bits. From the FPGA 240, the resultant output of 8-bit calibrated image data is sent to a memory unit 250. The image data may then be suitably output using output device 260.

The system of FIG. 2 is merely an example of an environment in which the presently described embodiments are implemented. It should be appreciated that, although a system using an example FPGA implementation is shown, the presently described may be implemented or realized in a variety of different architectures, configurations and/or environments including a variety of different hardware configurations using various suitable software techniques. In this regard, for example, it should be appreciated that various technology implementations such as processors and memories with executable code stored thereon, field programmable gate arrays (FPGAs) configured using a hardware description language (HDL), programmable logic devices (PLDs) and/or application-specific integrated circuits (ASICs) could be implemented singly or in combination to cause the systems (e.g. printing and scanning systems) to perform the methods, processes and techniques according to the presently described embodiments.

As to the methods according to the presently described embodiments, it should be appreciated that a system implementing the teachings of the presently described embodiments will, in at least one form, include encoding techniques and decoding techniques. The encoding techniques will, in at least one form, be implemented at set-up or re-set of the system. The decoding techniques will be implemented during the calibration process.

Figure 3:
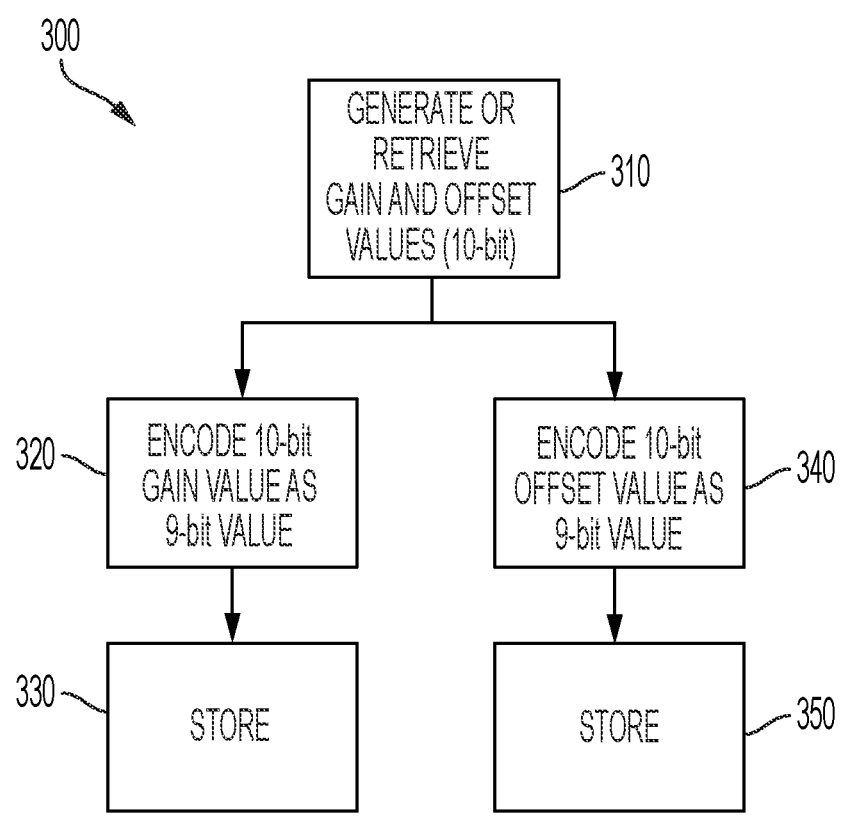
FIG. 3 is a flow chart illustrating a method according to the presently described embodiments.

A method for encoding the gain and offset values according to the presently described embodiments is illustrated in the flowchart of FIG. 3. In this regard, an encoding method 300 is shown. First, gain and offset values are generated or retrieved (at 310). It will be understood that the generation and storage or maintenance of the gain and offset values may be realized using any of a variety of techniques known to those of ordinary skill in the art. For example, the gain and offset values may be generated by the front end 230 or the FPGA 240, or any other suitable element. In this context, these values are typically 10-bit values. According to one example of the presently described embodiments, the 10-bit gain values are encoded as 9-bit values, as described above (at 320), by the FPGA and stored in, for example, memory section 242. Again, in one example, a predetermined value, here, 0x1.00, is subtracted from the values written into the appropriate pixel gain memories. The encoded gain value having a 9-bit form is then stored (at 330) for later retrieval for decoding by the FPGA during the calibration process. Likewise, the offset value, a 10-bit value, is encoded as a 9-bit value, as described above (at 340). Again, in one example, the most significant bit of the typical 10-bit offset value is deleted during this encoding process. The encoded offset value is then stored (at 350) by the FPGA in, for example, memory section 242 for later retrieval for decoding by the FPGA during the calibration process. As noted above, different mathematical techniques could be applied in the encoding process.

Figure 4:
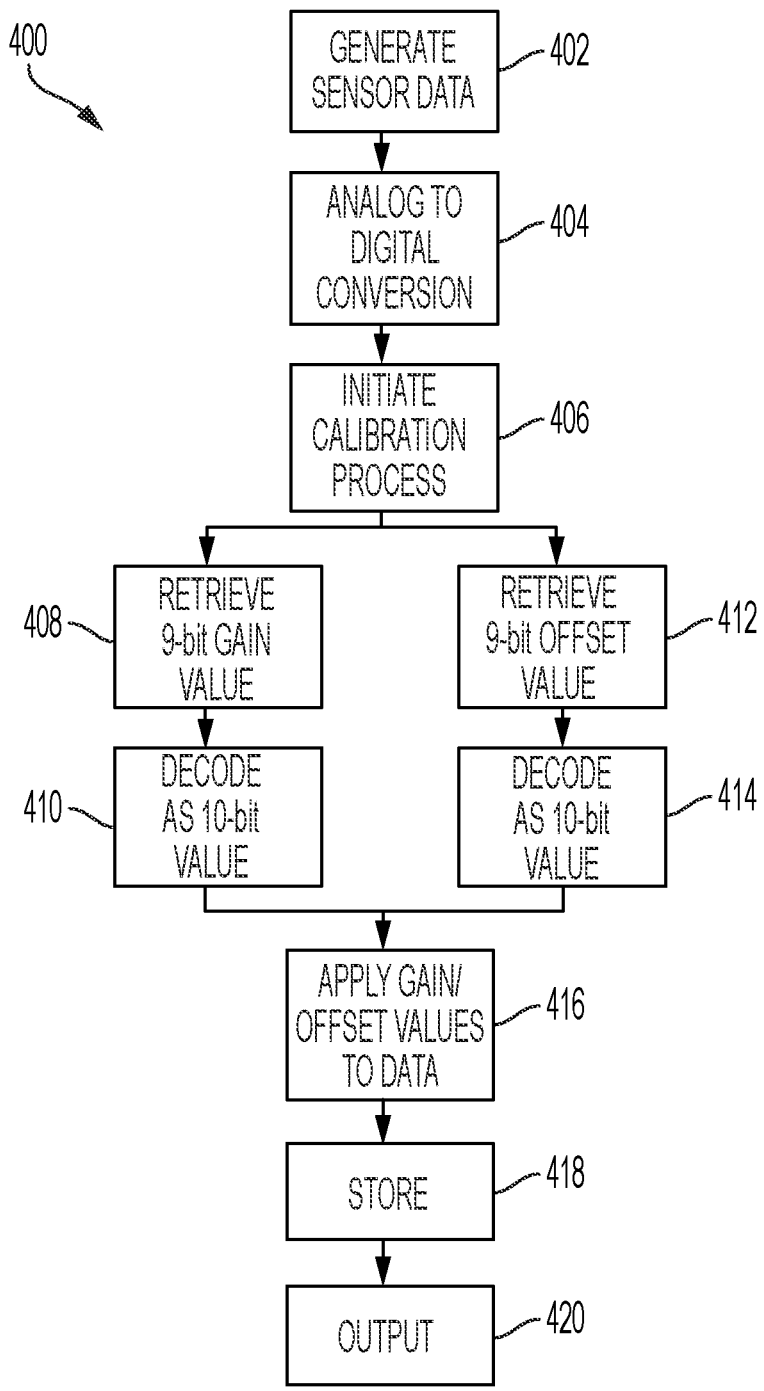
FIG. 4 is a flow chart illustrating a method according to the presently described embodiments.

With respect to the calibration process, which typically occurs with every scan job, reference is made to FIG. 4. As shown in FIG. 4, the process, a method 400, is initiated by generating sensor data (at 402) at the scan head by scanning an input document or image using any of a variety of well-known techniques. The sensor data is analog data. This analog sensor data is then converted to 10-bit digital data (at 404) by the front-end processor.

Once the 10-bit digital data is sent to the FPGA, the calibration process is initiated (at 406). That is, a 9-bit gain value is retrieved (at 408) from, for example, memory section 242, and decoded as a 10-bit gain value (at 410) by the FPGA. Here, in this example, as described above, 0x1.00 is added back to the stored value to produce the original 10-bit intended value. Likewise, a 9-bit offset value is retrieved (at 412) from, for example, memory section 242, and decoded as a 10-bit value (at 414) by the FPGA. In this example embodiment, the most significant bit is appended to the data value to obtain the decoded 10-bit value. As noted above, different mathematical techniques could be applied in the decoding process.

Then, the 10-bit gain and offset values are applied to the 10-bit image data (at 416) to obtain the calibrated image data. In at least one form, the resultant calibrated image date is 8-bit calibrated image data. The calibrated image date is then stored (at 418). Of course, the calibrated image data may be selectively output as appropriate (at 420).

The examples thus far described have included the encoding of 10-bit values to 9-bit values and the corresponding decoding of 9-bit values back to the original 10-bit values. This described encoding/decoding process finds particularly useful application in the contemplated environments wherein, as described in the examples, blocks of memory can be eliminated from a configuration to save cost and/or increase efficiency. As noted, the encoding of values to 9-bits for storage provides a bit size reduction for the values that is particularly suited for the memory sizes used in the described environments. However, it should be appreciated that memory can be saved or the system made more efficient by using a similar encoding and decoding process on other values, not just 10-bit values and 9-bit values. More generally, values of any bit size (e.g., n-bit values) can be encoded to smaller bit size values (e.g., <n-bit size values) that are suitable for particular storage configurations. In this regard, the particular storage configurations may be embodied in various memory sections having any of a variety of different native aspect ratios. For example, the memory section 242 may be of a different configuration or aspect ratio than the example described previously in connection with FIG. 2. Also, particular storage configurations may also be provided in addition to or as an alternative to the memory section 242 of FIG. 2.

Further, it should be appreciated that, in addition to the overall benefits of memory reduction and/or increased efficiency, there may be possible speed or performance improvements in situations where, for example, changing memory requirements according to the presently described embodiments results in, for example, a reduction in the number of memory reads that need to occur in a process.

Also, as noted above, the implementation of FIG. 2 is an example. The FPGA may be replaced (singly or in combination) by other suitable arrangements such as, for example, ASICs, various processor/memory configurations, PLDs, . . . etc., and any appurtenant modifications. In such variations, implementation of the presently described embodiments will generally have more beneficial impact in systems having fixed memory structures and/or limited resources.

Figure 5:
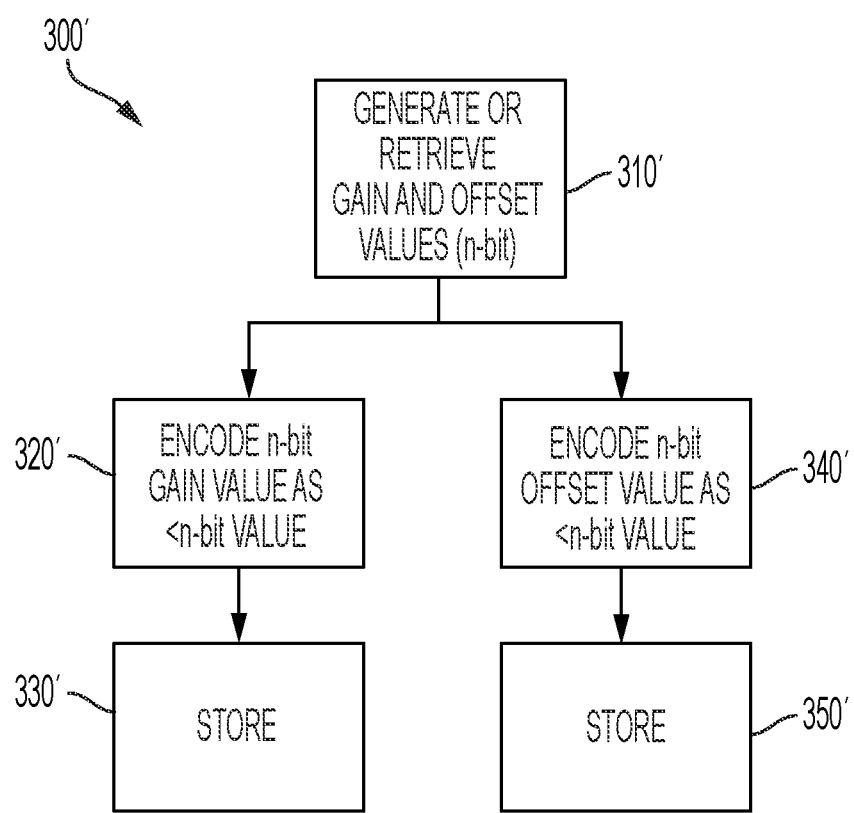
FIG. 5 is a flow chart illustrating a method according to the presently described embodiments.

In this regard, another method (e.g., to be implemented by, for example, the system of FIG. 2 or a variation thereof) for encoding the gain and offset values according to the presently described embodiments is illustrated in the flowchart of FIG. 5. In this regard, an encoding method 300' is shown. First, gain and offset values are generated or retrieved (at 310'). It will be understood that the generation and storage or maintenance of the gain and offset values may be realized using any of a variety of techniques known to those of ordinary skill in the art. In this context, these values are n-bit values. According to the presently described embodiments, the n-bit gain values are encoded as <n-bit values, as described above (at 320'). Again, in one example, a predetermined value is subtracted from the values written into the appropriate pixel gain memories. The encoded gain value having a <n-bit form is then stored (at 330') for later retrieval during the calibration process. Likewise, the offset value, an n-bit value, is encoded as a <n-bit value, as described above (at 340'). Again, in one example, the most significant bit of the n-bit offset value is deleted during this encoding process. The encoded offset value is then stored (at 350') in appropriate memory locations for later retrieval during the calibration process. As noted above, different mathematical techniques could be applied in the encoding process.

Figure 6:
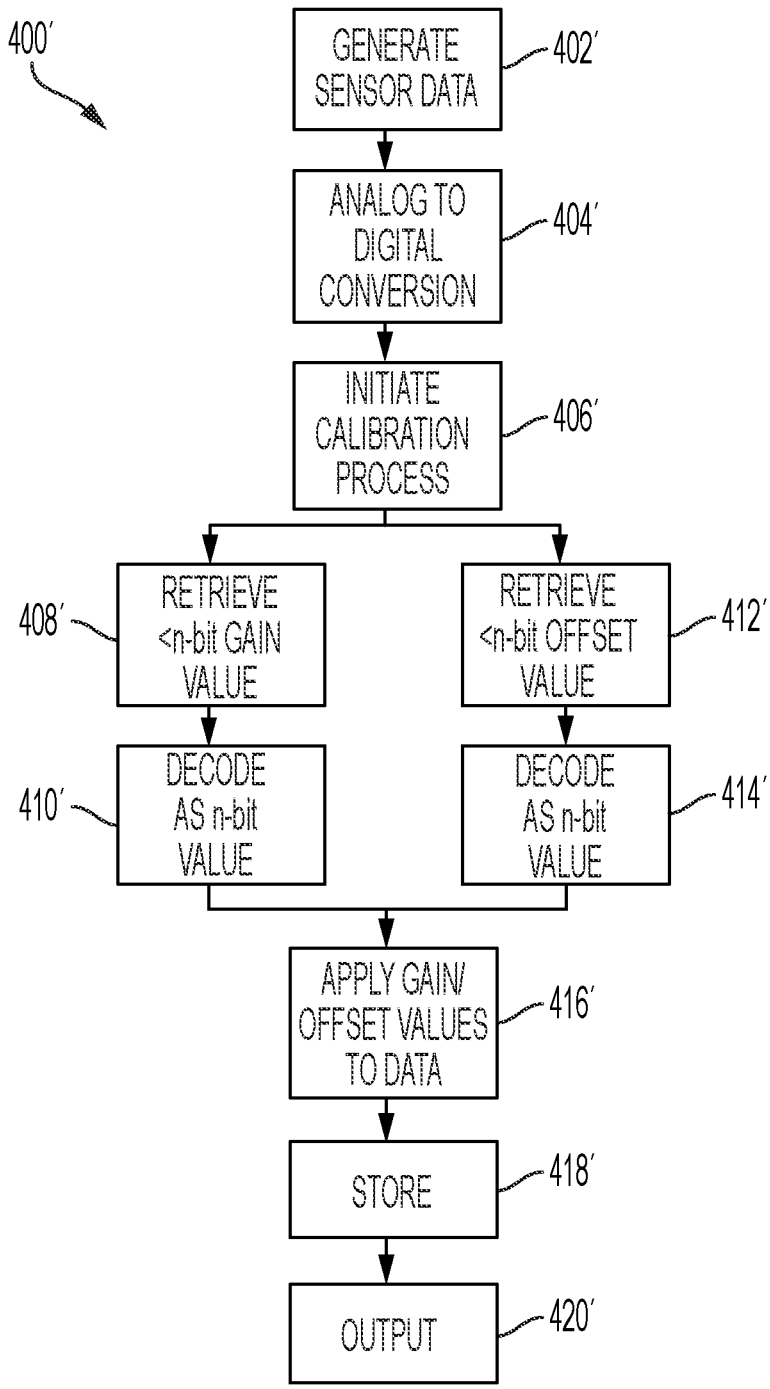
FIG. 6 is a flow chart illustrating a method according to the presently described embodiments.

With respect to the calibration process (e.g., to be implemented by, for example, the system of FIG. 2 or a variation thereof), which typically occurs with every scan job, reference is made to FIG. 6. As shown in FIG. 6, the process, a method 400', is initiated by generating sensor data (at 402') at the scan head by scanning an input document or image using any of a variety of well-known techniques. The sensor data is analog data. This analog sensor data is then converted to n-bit digital data (at 404') by the front-end processor or other suitable element.

Once the n-bit digital data is sent to the FPGA or other suitable element, the calibration process is initiated (at 406'). That is, a <n-bit gain value is retrieved (at 408') from memory and decoded as an n-bit gain value (at 410'). Here, in this example, as described above, the predetermined value is added back to the stored value to produce the original n-bit intended value. Likewise, a <n-bit offset value is retrieved (at 412') from memory and decoded as an n-bit value (at 414'). In this example embodiment, the most significant bit is appended to the data value to obtain the decoded n-bit value. As noted above, different mathematical techniques could be applied in the decoding process.

Then, the n-bit gain and offset values are applied to the n-bit image data (at 416') to obtain the calibrated image data. The resultant calibrated image date is then stored (at 418'). Of course, the calibrated image data may be selectively output as appropriate (at 420').

As described in FIGS. 5 and 6, various mathematical techniques could be used in the encoding and decoding processes. As described above, the implementation of any such mathematical techniques should take into account, for example, ranges of the values of interest, the continuity of such ranges and the desired precision of the encoding and decoding processes (e.g., whether precise values are desired or whether a quantization is acceptable).

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A scanner calibration system comprising:
   a scan device configured to scan a document or image to generate analog scan data;
   a front-end processor configured to convert the analog scan data to 10-bit digital scan data;
   a field programmable gate array configured to receive the 10-bit scan data, retrieve encoded 9-bit gain and offset data, decode the 9-bit gain and offset data into 10-bit gain and offset data, apply the decoded 10-bit gain and offset data to the 10-bit scan data to generate calibrated image data, and store the calibrated image data; and
   a memory configured to have stored therein the calibrated image data.

2. The system as set forth in claim 1 further comprising an output device configured to output the calibrated image data.

3. The system as set forth in claim 1 wherein, during a calibration process, the field programmable gate array is configured to decode the encoded 9-bit gain value by adding a predetermined value to the encoded 9-bit gain value to produce the decoded 10-bit gain value.

4. The system as set forth in claim 3 wherein the predetermined value is 0x1.00.

5. The system as set forth in claim 1 wherein, during a calibration process, the field programmable gate array is configured to decode the encoded 9-bit offset value by adding a most significant bit to the encoded 9-bit offset value to produce the decoded 10-bit offset value.

6. The system as set forth in claim 1 wherein the field programmable gate array is configured to encode 10-bit gain values by subtracting a predetermined value from the 10-bit gain values to produce 9-bit encoded gain values.

7. The system as set forth in claim 6 wherein the predetermined value is 0x1.00.

8. The system as set forth in claim 1 wherein the field programmable gate array is configured to encode 10-bit offset values by deleting a most significant bit of the 10-bit offset values to produce 9-bit encoded offset values.

9. A calibration method for use in a scanning system, the method comprising:
   generating analog sensor data by scanning a document or image using a scan head or device;
   converting the analog sensor data to 10-bit digital scan data;
   retrieving encoded 9-bit gain and offset values;
   decoding the encoded 9-bit gain value to a 10-bit gain value;
   decoding the encoded 9-bit offset value to a 10-bit offset value;
   applying the decoded 10-bit gain and offset values to the 10-bit digital scan data to generate calibrated image data; and
   storing the calibrated image data.

10. The method as set forth in claim 9 further comprising outputting the calibrated image data.

11. The method as set forth in claim 9 wherein the decoding of the encoded 9-bit gain value comprises adding a predetermined value to the 9-bit gain value to produce the 10-bit gain value.

12. The method as set forth in claim 11 wherein the predetermined value is 0x1.00.

13. The method as set forth in claim 9 wherein the decoding of the encoded 9-bit offset value comprises adding a most significant bit to the 9-bit offset value to produce the 10-bit offset value.

* * * * *